D. OTTINGER.
Fire-Escape.
No. 209,773. Patented Nov. 12, 1878.
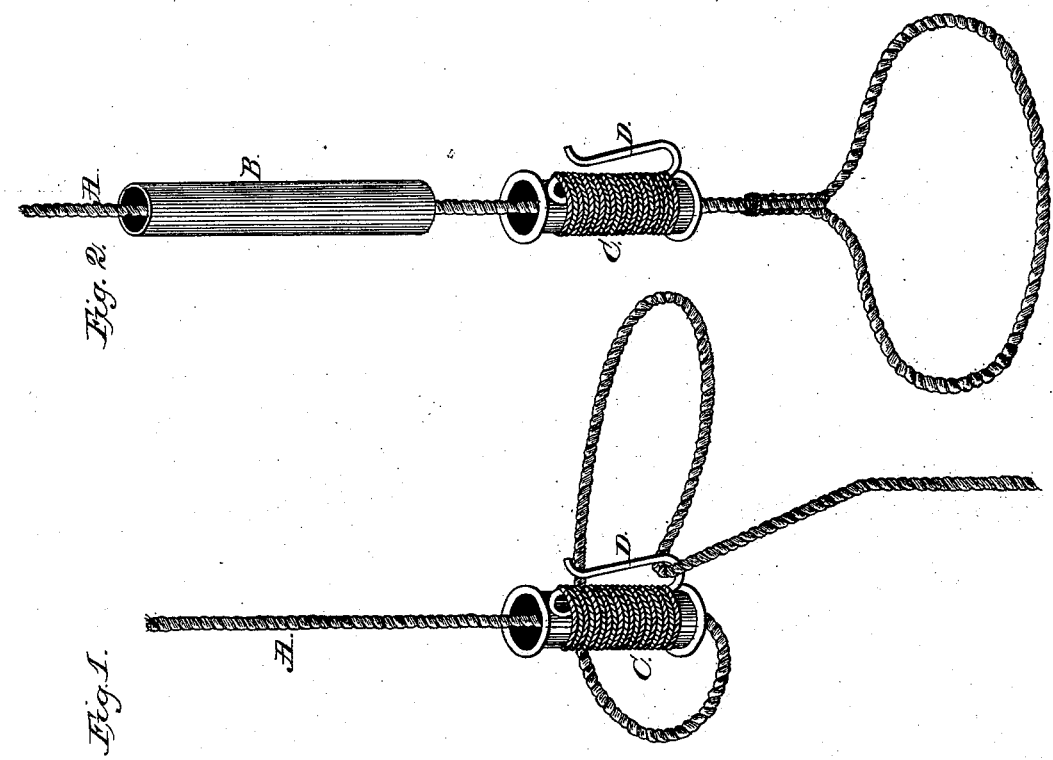
Witnesses:
Inventor:

UNITED STATES PATENT OFFICE.

DOUGLASS OTTINGER, OF ERIE, PENNSYLVANIA.

IMPROVEMENT IN FIRE-ESCAPES.

Specification forming part of Letters Patent No. 209,773, dated November 12, 1878; application filed July 17, 1878.

*To all whom it may concern:*

Be it known that I, DOUGLASS OTTINGER, of Erie, county of Erie, and State of Pennsylvania, have invented a new and useful Improvement in Fire-Escapes, which improvement is fully set forth in the following specification, reference being had to the accompanying drawings.

The object of my invention is to enable persons to escape from the upper parts of buildings through the windows or other apertures, or from the roof, in case of fire or other accident rendering such a means of escape necessary.

Figure 1 shows the looped rope, with metal tube and hook attached. Fig. 2 shows the looped rope, with metal tube and hook and the rubber tube to be used in connection with the rope.

I employ a rope peculiarly made of gill-twine or other material, as described in patent awarded February 26, 1878, No. 200,665, of sufficient strength to support a weight of six hundred pounds when lowered from any height under eighty feet.

I construct my fire-escape by taking a section of this rope A, with movable metal tube C and hook D attached, and the movable rubber tube B.

I may use my invention for the purpose of assisting another person to escape, substantially after the manner described in my patent above referred to, to wit: I slip the loop under the arms and around his chest, and then slide the metal tube to the waist. I then grasp the rubber tube with the right hand, reach back with left, grasp the rope, and bring it around waist to front. I then pay out the rope as the escaping person backs out of window or other aperture, and lower him to the ground.

If using it to save myself I attach a slip-noose on the upper end of rope to upper end of bed-frame or other suitable article in the room from which I am escaping; then stand with back toward window, rope on the right side, grasp the metal tube in right hand, reach left hand back and bring rope around waist to front, hitch it in hook on tube, step back and go out feet front, the rope loose or tight, as may be necessary to go out, and descend, having meanwhile placed a mattress or other suitable article on window-sill to protect rope from abrasion.

I claim as my invention—

1. The improved fire-escape apparatus herein described, consisting of the rope A, above described, having the metal tube C, with hook D attached.

2. In a fire-escape, the rope A, having the metal tube C, with hook D attached, and the rubber tube B, constructed and arranged to operate as shown and described.

DOUGLASS OTTINGER.

Witnesses:
   T. J. HOSKINSON,
   V. W. HOSKINSON.